Oct. 28, 1947.    J. D. PETOUHOFF    2,429,769
SELF-LOCKING HOOK
Filed Dec. 5, 1945    2 Sheets-Sheet 1

INVENTOR
JUSTIN D. PETOUHOFF
BY
John P. Mironow
ATTORNEY

Oct. 28, 1947.　　　　J. D. PETOUHOFF　　　　2,429,769
SELF-LOCKING HOOK
Filed Dec. 5, 1945　　　　2 Sheets-Sheet 2
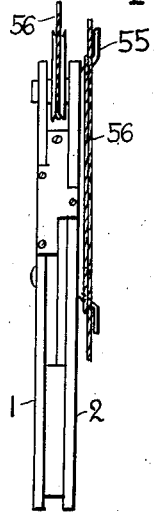
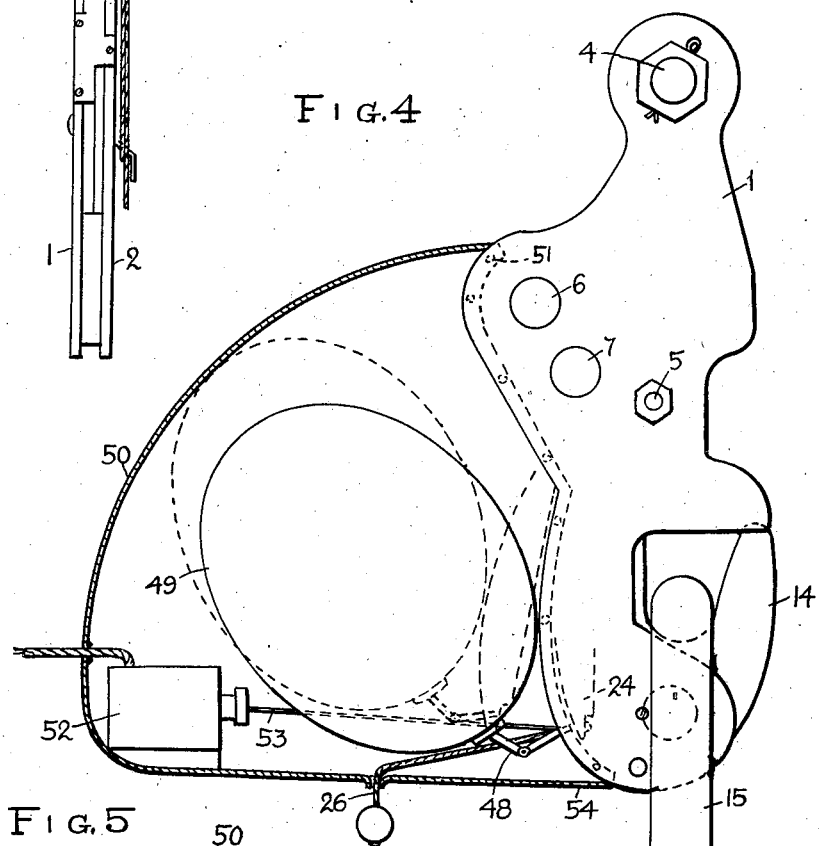
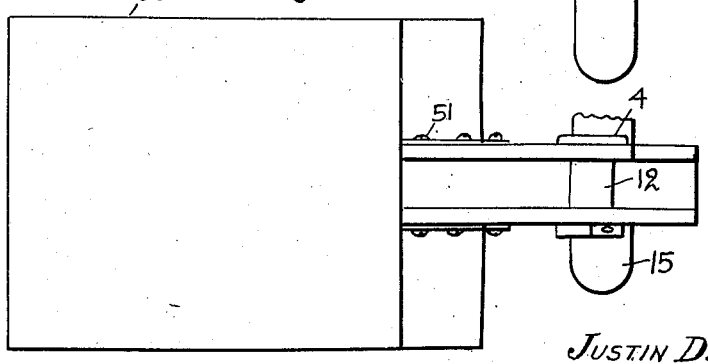
INVENTOR
JUSTIN D. PETOUHOFF
BY John P. Nikonow
ATTORNEY Patented Oct. 28, 1947

2,429,769

UNITED STATES PATENT OFFICE 2,429,769

SELF-LOCKING HOOK

Justin D. Petouhoff, New York, N. Y.

Application December 5, 1945, Serial No. 632,870

5 Claims. (Cl. 294—83)

My invention relates to self-locking hooks and has particular reference to hooks having hinged portions which can be releasably locked in an operative position of the hook.

This application is a continuation in part of my application, Serial No. 484,452, filed April 24, 1943, which has matured into Patent Number 2,406,250 issued August 20, 1946.

My invention has for its object to provide a hook for releasably supporting and fastening various objects, the hook having a hinged portion which can engage an object and be locked in the operative position but which can be released in any position at will by the movement of a releasing member.

Another object of my invention is to provide a self-locking hook which can be used to support a relatively great weight in a locked position, and which can be unlocked by the application of a relatively small force to the unlocking member.

Still another object of my invention is to provide a self-locking hook having its operating or movable parts substantially enclosed so that they can retain lubrication and for protection against snow, ice, rain, dirt or dust and rust.

Still another object of my invention is to provide a self-locking hook of the type above indicated which will be strong, streamlined, reliable in operation, compact and inexpensive to manufacture, and will not catch any object and will not be caught by other objects.

My hook can be adapted to be released by various agencies, such as by a magnet or by a float, in the latter case my hook can be conveniently used for automatically releasing life rafts or life boats on ships when ship is sinking.

My hook can be used for various purposes in various fields of application.

My invention is more fully described in the accompanying specification and drawings in which:

Fig. 4 is a side view of a modified device provided with a detachable housing for a float and/or magnet;

Fig. 5 is a top plan view of the modified device;

Fig. 6 is an end view of the device showing a detachable cleat for a rope suitable to use with scaffolds.

Figure 1:
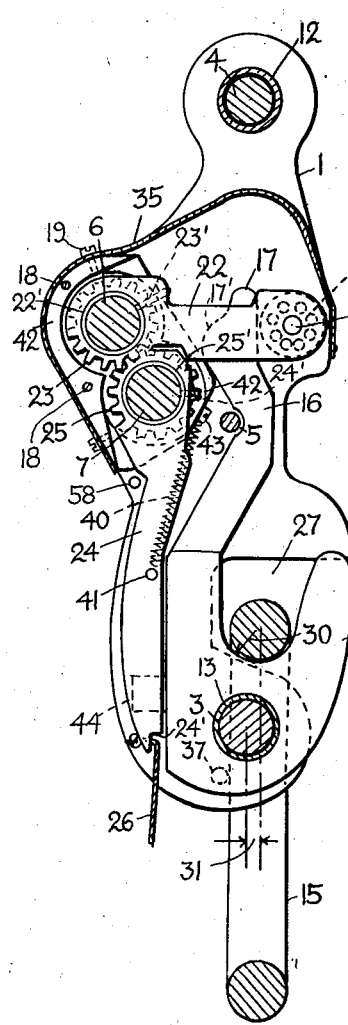
Fig. 1 is a sectional side view of the locking hook in a closed or operative position with the top plate removed.
Figure 2:
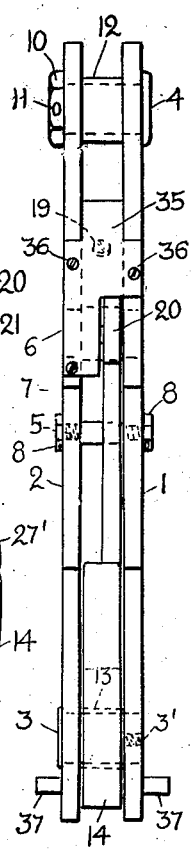
Fig. 2 is an edge view of the same.

My self-locking hook comprises a streamlined frame consisting of a base plate 1 and a cover plate 2 connected in a spaced relation to plate 2 by bolts 4, 5. The bolt 4 is tightened by a nut 10 locked by a cotter pin 11 and shouldered bolt 5 is tightened by nuts 8. A tubular spacer 12 is placed on the bolt 4 between the sides plates 1, 2 to keep them apart. While two plates 1 and 2 are shown on the drawing, it must be understood that a single base plate 1 can be used since it carries all the movable parts.

Figure 3:
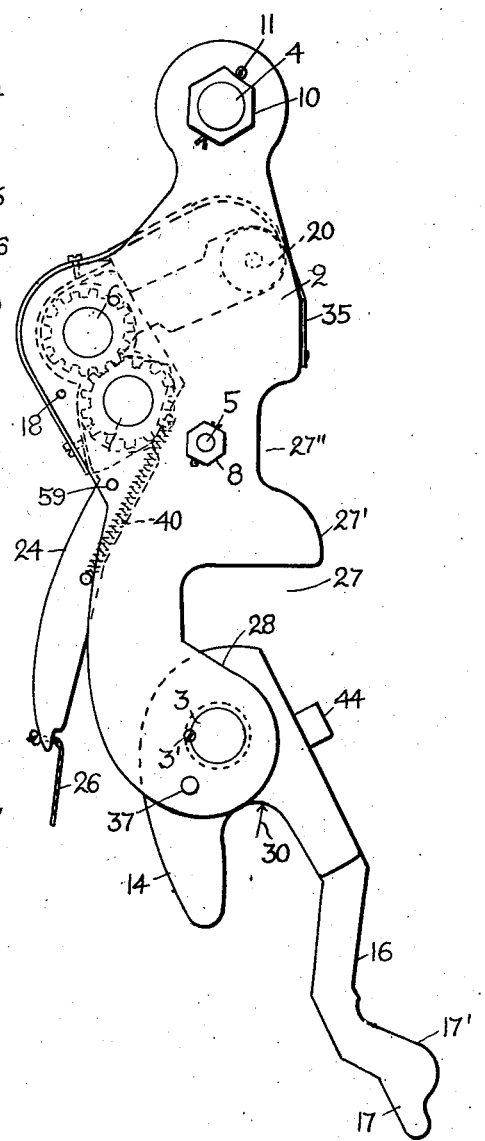
Fig. 3 is a side view of the same in an open or inoperative position.

The pin 3, secured in place by a set screw 3' flush with plate 1, constitutes a pivot for a hook 14 supporting a ring 15 such a link of a steel chain supporting a load. Recess 27 has edges below and behind the inner portion of the hook 14 so as to prevent the ring 15 from engaging the edges of the recess 27. A bronze bushing 13 is placed in the hook 14. The hook has a tail portion 16 extending between the side plates 1, 2 when the hook is turned into its locking position as shown in Fig. 1. The end 17 of the tail portion 16 is retained in this locking position by a roller 20, preferably in the form of a ball bearing, supported on a pin 21 held at one end in a lever 22. The other end of the lever 22 is mounted on the hub 22' of a gear 23 and is attached to the hub by a pin 23'. The gear 23 rotates on a shouldered screw 6. The gear 23 is in mesh with a similar gear 25 having a hub 25' fitted in an operating lever or handle 24 and secured by the pin 24'. The gears are placed in a gear box 42 held by pins 18. The lever 24 rotates on a shouldered screw 7 and extends downwards between the side plates 1, 2 when the hook is in the locking position. The outer end of the handle 24 is provided with a hole for the end of a cord 26 which can be used for manually or otherwise pulling the handle outwards for releasing the hook. The cord is fastened in a recess 24' at the end of the hook so that it cannot be torn or sheared off. As shown in Fig. 3, a relatively small movement of the handle 24 is sufficient to move the roller 20 off the end 17 of the tail portion 16 of the hook, allowing the hook to be rotated outwards as shown in Fig. 3 and allowing the chain or ring 15 to slide off the hook. The end 17 has a rounded portion 17' for engaging the roller 20 and pushing out the lever 22 for locking the tail end 16.

To facilitate the sliding movement of the ring 15, the plates 1, 2 are tapering downwards at 28 in the recess 27, the top edges of the plates in the recess being below the upper part of the inner curvature of the hook. The opening of the hook or its rotation on the pin 3 under action of a pull on the chain or ring 15 is made possible by the arrangement of parts whereby the center of the radius 30 of the inner curvature of the hook is displaced from the center of the pin 3 by a certain distance 31 when the hook is suspended on the bolt 4 and a load is applied to the chain or ring 15. The distance 31 may be relatively small, especially if the hook is designed to support a heavy load, when it is used, for instance to load or discharge a cargo, hold a life boat or raft on board of a ship or for towing a car, airplane, etc. in which case the force applied to the hook may be 5000 lbs. or more. The hook itself need not be very heavy to withstand such a load as there is practically no bending moment applied to the hook 14, and a very small bending moment applied to the side plates 1, 2, the major part of the load producing compression stress on the hook, particularly if the distance 31 is smaller than the radius of the pin 3 between the center of the pins 3 and the center of the roller 20 can be made relatively large so that the ratio of this distance to the distance 31 will be so large that only a small fraction of the force of the direct pull on the hook will be transmitted to the roller 20. Thus, if the roller 20 is made as a ball bearing the parts may be so proportioned that a force of a few ounces may be sufficient to turn the handle 24 into an opening position for the hook 14 under full load applied thereto. A lug 27' covers the end of the hook 14 from the sides and top and prevents the hook from being accidentally opened as by catching an obstruction, or accidentally releasing the ring or chain from the hook if there is a slack in the chain. A recess 27'' back of the lug 27' is provided to facilitate backing of the tail 16.

The upper portion of the frame of the hook with the inner moving parts can be protected against snow, ice, rain, damage or dirt by a curved shield 35 attached to the top edges of the side plates by screws 36. Lubricating hole is provided on top of the gear box 42 extending through the shield 35 and closed by a screw 19.

It may be noted that the parts are so aligned that when the hook is freely suspended on the bolt 4, the normal pull on the chain or ring 15 will always produce a turning moment with the arm of the moment equal to the distance 31. The ring 15 may be further retained in the correct position by short guiding or limiting pins 37. The end 17' of the tail portion 17 rests against the side of gear box 42 when the hook is in its operative position.

A spring 40 is provided for returning the handle 24 into its closing or operative position as shown in Fig. 1. One end of the spring is secured to a pin 41 under the handle 24 and the other end is secured to the side of gear box 42 by a screw 43. The gear box 42 is of the same thickness as the tail portion 16 and its purpose is to raise the relatively thin levers 22 and 24 so that the lever 22 can slide over the side of the top tail portion 17. A lug 44 of a reduced thickness extends from the back side of the hook 14 and serves as a guide for the lever 24.

My hook can be used for various purposes such as for discharging cargo, for supporting a load when it must be quickly released by the rope 26 for an anchor chain stopper, for hoisting load, for releasing life boat falls, life rafts, for fastening to the deck of a ship, for towing boats, and for scaffolds using attachable cleat on the side of the hook.

My hook can be provided with an automatic release by a float if it is used for supporting life rafts or life boats. Such an arrangement is shown in Figs. 4 and 5. The end of the handle 24 is connected by links 48 with a hollow float 49 which may be made of a plastic composition or light metal, placed in a sheet metal housing 50 which may be attached to the side plates 1, 2 as by screws 51. A relatively small float is sufficient to operate a hook supporting a load of 5000 lbs. for instance. Spring is not needed when the float is provided. A magnet 52 is also provided connected with the lever 24 by a cord 53 for releasing the hook at a distance. A drain hole 54 is provided at the bottom of the housing 50. As shown in Fig. 4 the magnet does not interfere with the operation of the float.

A cleat 55 can be attached to the side of the device by the nuts 10, 8 for a rope 56, this arrangement being used when my hook is connected to blocks for supporting a scaffold, etc.

The assembled hook is of a streamlined shape as shown in Fig. 1, so that it cannot be caught by any objects, ropes, etc., and the hook itself cannot catch any such projections when moved. A locking pin 58 may be provided for insertion in holes 59 in the plates 1 and 2 when it is desired to lock the hook 14 in a closed position.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A self locking hook comprising a frame consisting of two plates secured in a spaced relation to each other having means at one end for its suspension; a pivot at the other end of the frame; a hook rotatively supported on the pivot adapted to support a ring connected with a load, the frame having a recess registering with the hook for the load; a relatively long tail portion extending from the hook in the frame when the hook is in its operative position; a locking lever rotatively supported at one end on the frame; means at the free end of the lever slidably engaging the end of the tail extension of the hook; a handle rotatively supported in the frame extending downward from lever; a geared connection between the inner end of the handle and the pivoted end of the lever for rotating the lever by the outward movement of the handle for turning the lever upward into a releasing position for the tail end of the hook; the handle in its operative position when the hook is locked extending within the plates of the frame.

2. A self locking hook comprising a frame having means at one end for its suspension; a pivot at the other end of the frame; a hook rotatively supported on the pivot adapted to support a ring connected with a load, the frame having a recess registering with the hook for the load; a relatively long tail portion extending from the hook in the frame when the hook is in its operative position; a locking lever rotatively supported at one end on the frame; means at the free end of the lever slidably engaging the end of the tail extension of the hook; means to rotate the locking lever for releasing the hook thereby allowing the hook to be turned by the load into an inoperative position; a housing at the side of the frame; a handle rotatively supported in the frame; a float in the housing operatively connected to the handle for turning the handle thereby releasing the hook when the float is raised by being immersed in a liquid; and a magnet connected to the handle for turning the handle and releasing the hook.

3. A self locking hook comprising a pair of side plates of a substantially similar contour and of a generally smooth and streamlined contour to prevent catching other objects; means to hold the plates in a spaced relation to each other forming a frame; means at one end of the frame to suspend the frame; a pin passing through the frame at the other end thereof; a hook pivotally supported on the pin between the plates, the plates having recesses at the hook for admitting a ring supporting a load; a tail portion on the hook extending between the plate, the tail portion being of a reduced thickness; a lever rotatively supported at one end between the plates at the side of the tail portion; a roller at the other end of the lever engaging the end of the tail portion for preventing the rotation of the hook when the hook is in its operative position; a handle rotatively supported between the plates; a geared connection between the handle and the lever for rotating the lever into unlocking position for the tail portion by turning the handle outwards, the handle in its operative position with the hook locked extending between the plates the plates entirely enclosing at the sides the inner end portion of the hook, the lever and the handle in the closed position.

4. A self locking hook comprising a pair of side plates of a generally smooth and streamlined contour to prevent catching other objects; means to hold the plates in a spaced relation to each other forming a frame; means at one end of the frame to suspend the frame; a pin passing through the frame at the other end thereof; a hook pivotally supported on the pin between the plates, the plates having recesses at the hook for admitting a ring supporting a load; a tail portion on the hook extending between the plates, the tail portion being of a reduced thickness; a lever rotatively supported at one end between the plates at the side of the tail portion; a roller at the other end of the lever engaging the end of the tail portion for preventing the rotation of the hook when the hook is in its operative position; a handle rotatively supported between the plates; a geared connection between the handle and the lever for rotating the lever into unlocking position for the tail portion by turning the handle outwards, the handle in its operative position with the hook locked extending between the plates; and a shield extending between the plates over the geared portions of the lever and the handle.

5. A self locking hook comprising a pair of side plates of a generally smooth contour to prevent catching other objects; a block secured to the plates therebetween holding the plates in a spaced relation to each other forming a frame; means at one end of the frame to suspend the frame; a pin passing through the frame at the other end thereof; a hook pivotally supported on the pin between the plates, the plates having recesses at the hook for admitting a ring supporting a load, a tail portion on the hook extending between the plates; a lever rotatively supported at one end between the plates; a roller at the other end of the lever engaging the tail portion when the hook is in an operative position; a handle rotatively supported between the plates; and gear members on the handle and on the lever in mesh with each other, the block having recesses enclosing the gear members.

JUSTIN D. PETOUHOFF.

REFERENCES CITED

The following references are of record in the file of this patent:

UNITED STATES PATENTS

| Number | Name | Date |
|---|---|---|
| 23,985 | Meadley | May 10, 1859 |
| 110,116 | Cottingham | Dec. 13, 1870 |
| 644,699 | Woodford | Mar. 6, 1900 |
| 845,693 | Coats et al. | Feb. 26, 1907 |
| 870,593 | Sprogis | Nov. 12, 1907 |
| 2,228,060 | Lescher et al. | Jan. 7, 1941 |
| 2,344,446 | Martinson | Mar. 14, 1944 |
| 2,388,005 | Merwin | Oct. 30, 1945 |